United States Patent
Sato et al.

(10) Patent No.: US 7,317,482 B2
(45) Date of Patent: Jan. 8, 2008

(54) DISTANCE CALCULATING METHOD AND IMAGING DEVICE

(75) Inventors: Nobuyuki Sato, Tokyo (JP); Ken Nakajima, Tokyo (JP)

(73) Assignee: Sony Corporation, Tokyo (JP)

( * ) Notice: Subject to any disclaimer, the term of this patent is extended or adjusted under 35 U.S.C. 154(b) by 834 days.

(21) Appl. No.: 10/239,137

(22) PCT Filed: Jan. 23, 2002

(86) PCT No.: PCT/JP02/00462

§ 371 (c)(1),
(2), (4) Date: Feb. 24, 2003

(87) PCT Pub. No.: WO02/59837

PCT Pub. Date: Jan. 8, 2002

(65) Prior Publication Data

US 2003/0156190 A1    Aug. 21, 2003

(30) Foreign Application Priority Data

Jan. 23, 2001   (JP) ............................... 2001-14852

(51) Int. Cl.
*H04N 9/64* (2006.01)
*H04N 5/225* (2006.01)
*H04N 17/00* (2006.01)
*H04N 1/40* (2006.01)
*G06K 9/40* (2006.01)
*G02B 5/32* (2006.01)

(52) U.S. Cl. ................. 348/251; 348/207.99; 348/335; 348/187; 358/461; 382/274; 359/16

(58) Field of Classification Search ............... 348/251, 348/187
See application file for complete search history.

(56) References Cited

U.S. PATENT DOCUMENTS

| | | | | |
|---|---|---|---|---|
| 5,555,313 A | * | 9/1996 | Zheng et al. | 382/245 |
| 5,675,380 A | * | 10/1997 | Florent et al. | 348/251 |
| 5,703,604 A | * | 12/1997 | McCutchen | 348/36 |
| 5,818,527 A | * | 10/1998 | Yamaguchi et al. | 348/335 |
| 6,201,574 B1 | * | 3/2001 | Martin | 348/335 |
| 6,538,691 B1 | * | 3/2003 | Macy et al. | 348/241 |
| 6,574,376 B1 | * | 6/2003 | Shiota et al. | 382/293 |
| 6,747,702 B1 | * | 6/2004 | Harrigan | 348/335 |
| 6,833,862 B1 | * | 12/2004 | Li | 358/461 |
| 6,937,282 B1 | * | 8/2005 | Some et al. | 348/340 |
| 6,985,183 B2 | * | 1/2006 | Jan et al. | 348/188 |

FOREIGN PATENT DOCUMENTS

| | | | |
|---|---|---|---|
| JP | 62-34283 | | 2/1987 |
| JP | 62-034283 | * | 2/1987 |
| JP | 6-281588 | | 10/1994 |

\* cited by examiner

*Primary Examiner*—Nhan Tran
(74) *Attorney, Agent, or Firm*—Frommer Lawrence & Haug LLP; William S. Frommer; Thomas F. Presson

(57) ABSTRACT

A distance calculation method and an imaging device that can be applied to a digital camera. The method includes calculating a distance between a point corresponding to an optical axis of a lens sub-system of the imaging device and an input point, and using the calculated distance to correct defects such as shading that occur in formed images due to peripheral light fall-off in the lens sub-system. The distance is approximated by a polygon having five or more sides, preferably having 8 or 16 sides. The distance is calculated by a disclosed function having constant coefficients, so that distances can be calculated by simple hardware.

30 Claims, 17 Drawing Sheets

FIG. 8

|  | V Counter |  | V Counter after Conversion |  | Actual V Counter |  |
|---|---|---|---|---|---|---|
| G R | 0 | ×4 | 0 |  | 0 | G |
| B G |  |  |  |  | 1 | B |
| G R |  |  |  |  | 2 | G |
| B G |  |  |  |  | 3 | B |
| G R |  |  |  |  | 4 | G |
| B G | 1 | ×4 | 4 | ≠ | 5 | B |
| G R |  |  |  |  | 6 | G |
| B G |  |  |  |  | 7 | B |
| G R | 2 | ×4 | 8 |  | 8 | G |
| B G |  |  |  |  | 9 | B |
| G R |  |  |  |  | 10 | G |
| B G |  |  |  |  | 11 | B |
| G R |  |  |  |  | 12 | G |
| B G | 3 | ×4 | 12 | ≠ | 13 | B |
| G R |  |  |  |  | 14 | G |
| B G |  |  |  |  | 15 | B |

DISTANCE CALCULATING METHOD AND IMAGING DEVICE

This application is a §371 national stage application of PCT/JP02/00462, filed on Jan. 23, 2002, the entirety of which is hereby incorporated by reference herein, and claims priority under §119(a) from Japanese application 2001-14852, filed on Jan. 23, 2001, the entirety of which is hereby incorporated by reference herein.

TECHNICAL FIELD

The present invention relates to a distance calculating method and an image pick-up apparatus which, when used for a digital camera, for example, can be favorably used to calculate the distance on an image pick-up unit between a point that corresponds to the optical axis of the lens system and a desired point and then use the calculated distance value when compensating for defects such as shading that are produced in the outputted image due to peripheral light fall-off of the lens system, for example and particularly to a distance calculating method and an image pick-up apparatus that can favorably calculate distances using a simple hardware construction and can compensate for lens shading and the like using the calculated distance values.

BACKGROUND ART

In an image pick-up apparatus that normally has a lens system and an image pick-up unit, there is the risk of defects such as shading appearing in the picked-up photographic image due to peripheral light fall-off caused by the lens system, for example. The generation of such defects is prevented by designing a lens system so as to include multiple lenses, for example, though such lens systems that are composed of multiple lenses are expensive, so that in many cases such lens systems cannot be implemented in consumer appliances.

On the other hand, when signals are outputted in accordance with an X-Y coordinate system, as in the case with appliances that use semiconductor image pick-up devices for example, the image can be corrected by performing a digital process on the outputted signals. In the field of scanners and the like, for example, a variety of techniques have already been proposed for digitally compensating for lens shading, such as warping, peripheral light fall-off, and color bleeding that occur when image pick-up is performed with a cheap lens system (see Japanese Laid-Open Patent Application Nos. 11-355511, 2000-41183, etc.)

However, these conventional techniques can only be applied to the field of scanners and similar devices, where it is permissible for the compensation processing to take a fair amount of time and there are no demands for compensation to be performed in real-time as with the case of digital cameras, for example. On the other hand, as one example, Japanese Laid-Open Patent Application No. 2000-41179 proposes a technique for digitally compensating lens shading and the like in a digital camera.

In more detail, in an apparatus that performs image pick-up using a lens system, lens shading, such as warping, peripheral light fall-off, and color bleeding, is believed to be related to the distance from the optical axis of the lens system. For this reason, if the signals for pixels produced by image pick-up are corrected in accordance with this distance, a reduction can be made in lens shading, or the lens shading can be compensated for. Accordingly, to perform such compensation, it is necessary to first calculate how far a pixel to be corrected is located from the optical axis of the lens system.

However, in a conventional method for calculating the distance d from the optical axis of the lenses, the distance between the origin O and the correction target pixel is set as at x on the X coordinate axis and is set at y on the Y coordinate axis, and the distance is found as $d=\sqrt{(x^2+y^2)}$ using Pythagoras' Theorem. However, since the calculation of squares and the calculation of a square root are performed, an extremely large circuit construction is required to realize a calculation means in hardware.

It should be noted that while the above calculations can be performed using software, there is the problem that such software calculations take too much time for the processing to be performed in real-time in a digital camera. While a technique (see Japanese Laid-Open Patent Application No. 7-95856) for performing the calculations using simplified hardware has been proposed, such calculations are not very precise, so that in order to correct luminance such as peripheral light fall-off, it becomes necessary to calculate distances with higher precision.

Also, with the above hardware-based calculation of distances, there is the risk that it will not be possible to correctly find the distance from the optical axis when there are changes in the size of the image pick-up unit or changes in the reading out method, such as when pixels are skipped in the case where a charge transfer device is used as the image pick-up unit. This is to say, when pixels are skipped as shown in FIG. 18A, the correction that is originally performed as shown in FIG. 18B becomes as shown in FIG. 18C, so that it is no longer possible to perform the correction correctly using fixed hardware.

The present application was conceived in view of the above, and attempts to solve the problems with conventional methods and apparatuses in that an extremely large circuit construction is required to realize a distance calculation means in hardware, in that a simplified circuit construction is not able to calculate distances with high precision, and in that it is not possible to correctly find the distance from the optical axis when there are changes in the reading out method, such as when the size of the image pick-up unit changes or when pixels are skipped.

DISCLOSURE OF THE INVENTION

The present invention calculates a distance on an image pick-up unit between a point corresponding to an optical axis of the lens system and a desired point and uses the calculated distance value to correct defects such as shading due to peripheral light fall-off in the lens system, for example. To do so, the present invention performs a calculation using a formula where the calculation of distance is approximated using a polygon, and lens shading and the like is corrected using the calculated distance value. By doing so, distances can be well calculated using a simple hardware construction and lens shading and the like can be well corrected using the calculated distance values. Related to this, a distance calculation method and an image pick-up apparatus of the present invention are disclosed.

BRIEF DESCRIPTION OF THE DRAWINGS

FIG. 8 is an explanatory view of a skipping of coordinates.

BEST MODE FOR CARRYING OUT THE PRESENT INVENTION

Figure 1:
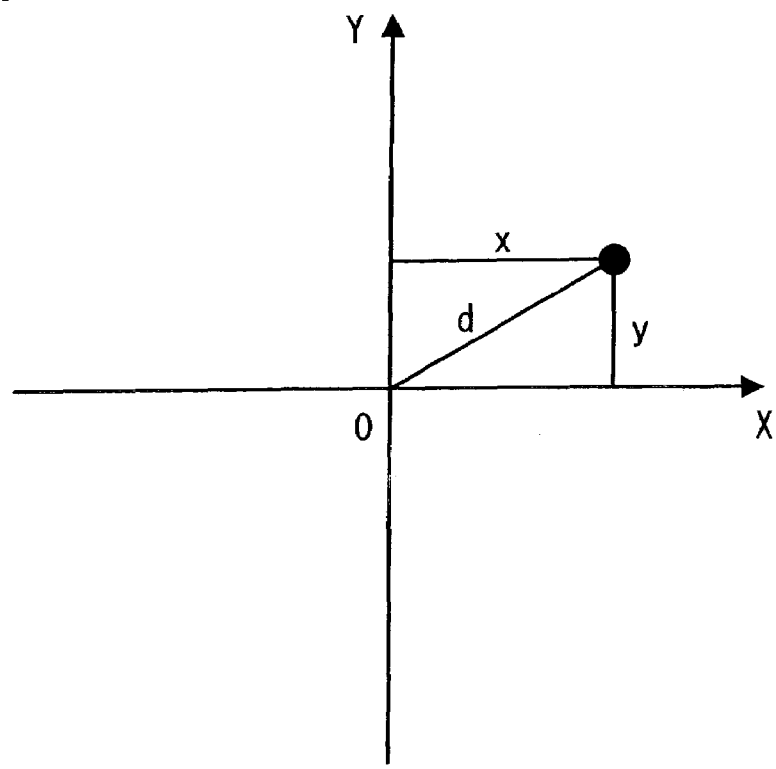
FIG. 1 is an explanatory view of a distance calculation method to which the present invention has been applied.
Figure 2:
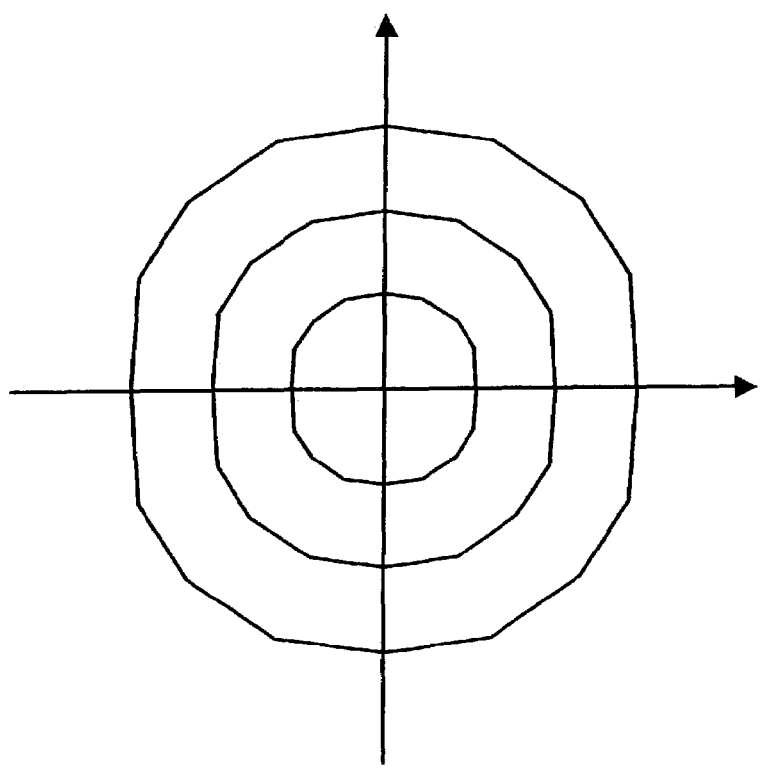
FIG. 2 is an explanatory view of a distance calculation method to which the present invention has been applied.

The following describes the present invention with reference to the attached drawings. First, a distance calculating method of the present invention is described as calculating a distance d between an arbitrary origin O and a desired point as shown in FIG. 1, for example, with the method calculating a value x for the distance in the X coordinate axis and a value y for the distance in the Y coordinate axis between the arbitrary origin O and the desired point. After this, when calculating the distance d, the calculation of equidistant curves in the form of concentric circles that are centered on the origin O is performed by approximating the concentric circles to regular 16-sided polygons, as shown in FIG. 2.

This is to say, by approximating to 16-sided polygons in this way, the formula for the distance d is given as $$d = a(x+y) + b|x-y| + c[|2x-y| + |x-2y|]$$ [Equation 1]

When [Equation 1] is solved using the distance d=r for the point (r, 0), d=$\sqrt{2}$ r for the point (r, r), and d=$\sqrt{5}$ r for the point (r, 2r) so that the distance is calculated as the same for each vertex in a 16-sided polygon, the values of the coefficients are given as $$a = [\sqrt{5} - 1]/2$$

$$b = [2\sqrt{5} - 3\sqrt{2}]/2$$

$$c = [\sqrt{2} - (\sqrt{5} + 1)]/2.$$

Accordingly, by substituting these coefficients (a, b, c) into [Equation 1], the distance d approximated by a regular 16-sided polygon can be found for a desired point (x, y). In this case, the calculation shown in Equation 1 no longer includes calculations that find a square of a number or a square root, so that the calculation means can be easily realized using hardware, for example.

Figure 3:
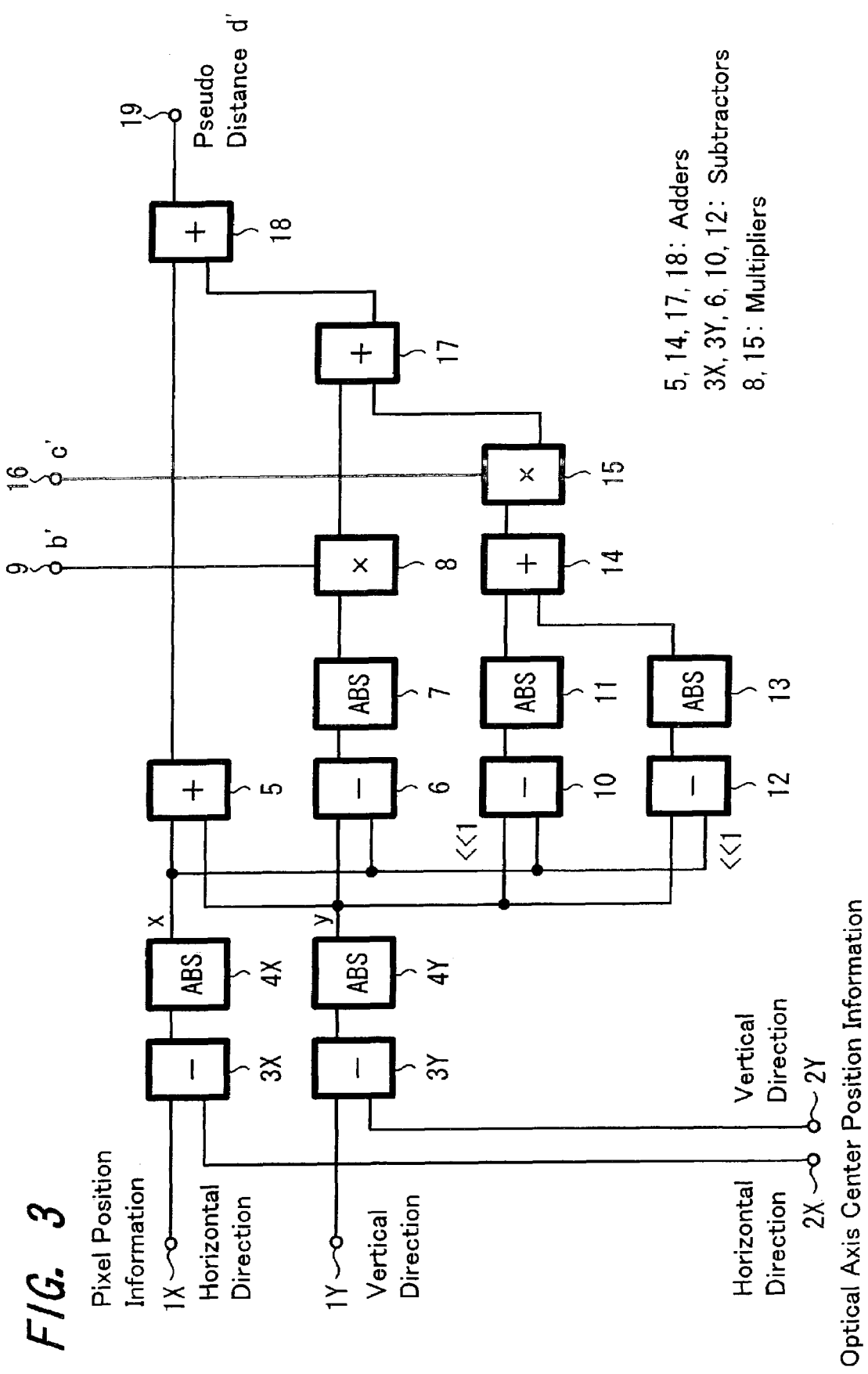
FIG. 3 shows a block diagram of an embodiment of a distance calculation means to which a distance calculation method of the present invention has been applied.

In more detail, FIG. 3 shows one embodiment of a distance calculation means to which the distance calculation method of the present invention has been applied. It should be noted that in this embodiment, the distance is found as the value d'=d/a using the equation $$d' = (x+y) + b'|x-y| + c'[|2x-y| + |x-2y|]$$ [Equation 2]

where $$b' = [2\sqrt{5} - 3\sqrt{2}]/[\sqrt{5} - 1]$$

$$c' = [\sqrt{2} - \sqrt{5} + 1]/[\sqrt{5} - 1],$$

so that a times the distance d can be found as the pseudo distance d', and by using a lookup table for such values, a table or the like can be prepared corresponding to values of the pseudo distances d' in advance.

In FIG. 3, information on the pixel position of the desired pixel, which is to say, a coordinate in the horizontal direction (X axis) and a coordinate in the vertical direction (Y axis) of the desired pixel information, is supplied to the terminals 1X and 1Y. Information on an optical axis central position, which is to say, a coordinate in the horizontal direction (X axis) and a coordinate in the vertical direction (Y axis) is also respectively supplied to the terminals 2X and 2Y. These pieces of position information are also respectively supplied to the subtractors 3X and 3Y, and the subtraction results are supplied to absolute value (ABS) circuits 4X and 4Y, so that the distance value x on the X coordinate axis and the distance value y on the Y coordinate axis are found for the distance between the arbitrary origin O and the desired point.

The distance value x and the distance value y outputted by the ABS circuits 4X and 4Y are supplied to an adder 5 where the first term on the right side of [Equation 2] given earlier is found. The distance value x and the distance value y are also supplied to a subtractor 6 and the subtraction result is supplied to an absolute value (ABS) circuit 7, thereby producing the absolute value in the second term on the right side of [Equation 2] given earlier. This absolute value is supplied to a multiplier 8, where the value is multiplied by the value b' from a terminal 9 so as to produce the second term on the right side of [Equation 2].

The distance value x is also shifted upwards by one bit. It should be noted that the values used in the present embodiment are expressed in binary, so that shifting a value upwards by one bit corresponds to doubling the value. In the drawings, an upwards bit shift is shown as [<<n] where n expresses the number of bits shifted. The distance value x that has been doubled is supplied to a subtractor 10 where the distance value y mentioned earlier is subtracted. The subtraction result is supplied to the absolute value (ABS) circuit 11, where the first absolute value in the third term on the right side of [Equation 2] mentioned above is found.

The distance value x mentioned above is also supplied to a subtractor 12, with the distance value y mentioned above being shifted upwards by one bit and also being supplied to the subtractor 12. The distance value y that has been doubled is subtracted from the distance value x and the subtraction result is supplied to the absolute value (ABS) circuit 13, where the second absolute value of the third term on the right side of [Equation 2] mentioned above is found. These absolute values are added by an adder 14 and the result is then supplied to a multiplier 15, so that the result is multiplied by a value c' supplied from the terminal 16, thereby producing the third term on the right side of [Equation 2].

The value of the second term on the right side of [Equation 2] that is found by the multiplier 8 mentioned above and the value of the third term on the right side of [Equation 2] that is found by the multiplier 15 are added by an adder 17, and the addition result is added by an adder 18 to the first term on the right side of [Equation 2] that is found by the adder 5. By doing so, the value d' of the pseudo distance is calculated according to [Equation 2] given above and is outputted from a terminal 19. It should be noted that the value d' can be multiplied by a to produce the distance d, or a lookup table that is provided in advance for different values d' of the pseudo distance can be used.

Accordingly, with the present embodiment, an equation that approximates a calculation of distances using a polygon is used to perform calculations, so that a good calculation method can be achieved using a simple hardware construction. By using such calculated distance values, lens shading and the like can be well corrected in an apparatus, such as a digital camera, where real-time correction processing is required.

In this way, the present invention solves the problems in that calculations of distance conventionally require an extremely large circuit construction when the distance calculation means is realized by hardware, and in that distances could not be calculated with a high degree of precision with simplified hardware.

Figure 4:
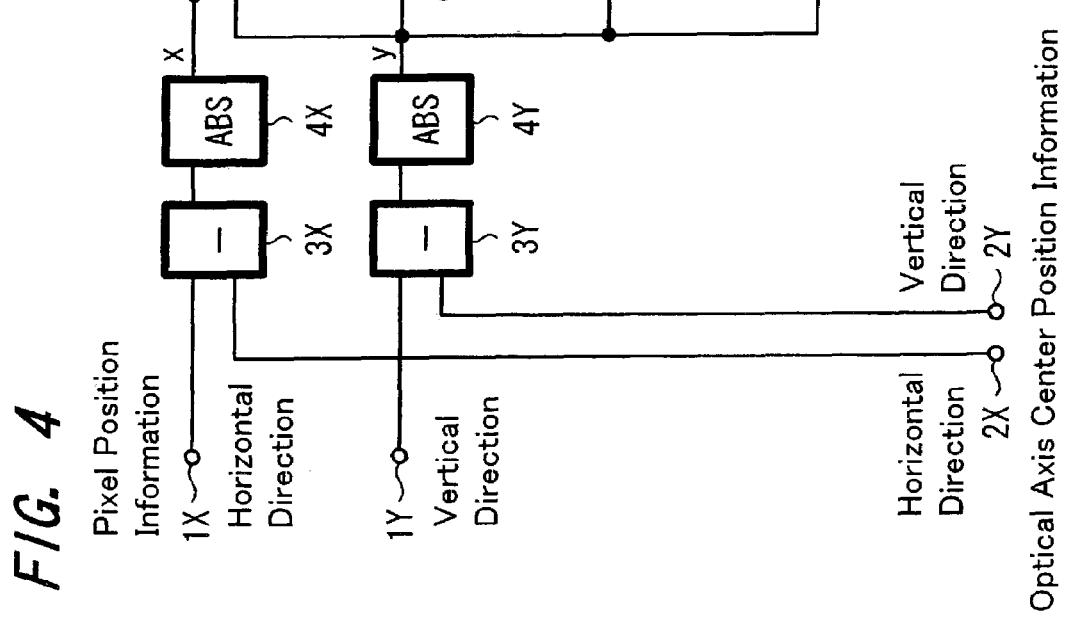
FIG. 4 shows a block diagram of another embodiment of a distance calculation means to which a distance calculation method of the present invention has been applied.

Also, in the above embodiment, the multipliers 8 and 15 are used for the multiplication of the value b' and the value c', though such multipliers do not always have a small circuit construction. For this reason, a method in which the multipliers are eliminated is described in the following embodiment. This is to say, FIG. 4 shows a block diagram of an embodiment of a distance calculation means that uses a method where the multipliers described above have been eliminated. It should be noted that in the description of a block diagram of FIG. 4, parts that correspond to those of the block diagram in FIG. 3 that was described above have been given the same reference numerals and overlapping description thereof is omitted.

In FIG. 4, the absolute value from the absolute value (ABS) circuit 7 is supplied to an adder 20, and this absolute value is added to the result of shifting the absolute value upwards by one bit [<<1]. By doing so, a calculation that trebles the input value is performed by the adder 20. The addition result is then shifted down by four bits and outputted. The absolute value outputted from the absolute value circuit 11 and the absolute value outputted from the absolute value circuit 13 are supplied to an adder 21, and the resulting addition value is then shifted down by three bits and outputted.

It should be noted that the values used in the present embodiment are expressed in binary, so that shifting a value downwards by four bits corresponds to multiplying the value by 1/16 and shifting a value downwards by three bits corresponds to multiplying the value by 1/8. Also, in the drawings, a downwards bit shift is shown as [>>m] where m expresses the number of bits shifted. The values found by the adders 20 and 21 are added by the adder 17. The rest of a block diagram is the same as a block diagram shown in FIG. 3 that is described above.

With the present circuit, the input value of the adder 20 is subject to a process that multiplies the value by 3/16. As given above, $b'=[2\sqrt{(5)}-3\sqrt{(2)}]/[\sqrt{(5)}-1]$=approximately 0.1856656, with 3/16=0.1875 being an approximation of this value. Also, the input value of the adder 20 is subject to a process that multiplies the value by 1/8. As given above, $c'=[\sqrt{(2)}-\sqrt{(5)}+1]/[\sqrt{(5)}-1]$=approximately 0.1441228, with 1/8=0.125 being an approximation of this value.

Accordingly, in the present embodiment, the multiplication of the value b' and the value c' can be performed using only additions and bit shifts and without using multipliers. Additionally, values used for the values b' and c' are not limited to 3/16 and 1/8. For example the multiplication of the value c' can be performed through additions and bit shifts using the approximate value 5/32=0.15625. Also, depending on factors such as the hardware that is used, other appropriate values can be selected.

Also, in the above embodiment, the case where regular 16-sided polygons are used as the polygons which approximate to the concentric circles is described, though other polygons, such as regular 8-sided polygons, can be used to approximate to the concentric circles. This is to say, the value d' for the pseudo distance can be found using the following formula.

$$d'=(x+y)+k|x-y|$$ [Equation 3]

Figure 5:
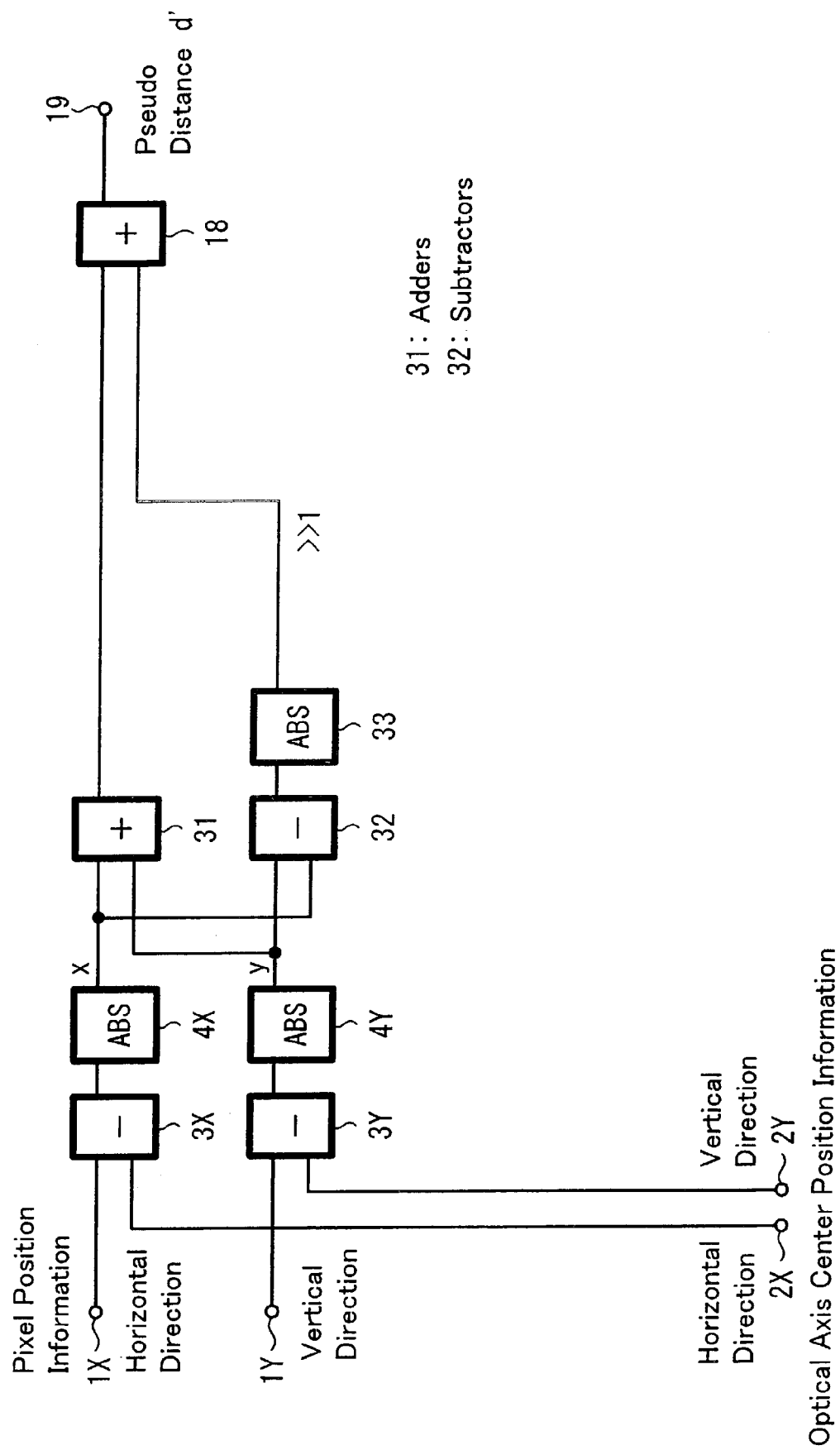
FIG. 5 shows a block diagram of another embodiment of a distance calculation means to which a distance calculation method of the present invention has been applied.

In [Equation 3], the value $k=\sqrt{(2)}-1$ is approximately 0.4142135, but by approximating this value k to 1/2=0.5, a circuit construction such as that shown in FIG. 5 can be used. This is to say, FIG. 5 shows an embodiment of a distance calculation means using a method that performs a calculation of distances using [Equation 3] given above. It should be noted that in the description of a block diagram of FIG. 5, parts that correspond to those of a block diagram in FIG. 3 that was described above have been given the same reference numerals and overlapping description thereof is omitted.

In FIG. 5, the distance value x and the distance value y from the absolute value circuits 4X, 4Y mentioned above are supplied to an adder 31, and the first term on the right side of [Equation 3] given above is found. The distance value x and the distance value y from the absolute value circuits 4X, 4Y mentioned above are also supplied to a subtractor 32 and the subtraction result is supplied to an absolute value (ABS) circuit 33, thereby producing the absolute value of the second term on the right side of [Equation 3] given above. The resulting absolute value is then shifted downwards by one bit [>>1] and outputted.

It should be noted that the values used in, the present embodiment are expressed in binary, so that shifting a value downwards by one bit corresponds to multiplying the value by 1/2. As a result, the second term on the right side of [Equation 3] given above is found from the absolute value circuit 33. The values found by the adder 31 and the absolute value circuit 33 are then added by the adder 18. The other parts of a block diagram are the same as in a block diagram shown in FIG. 3. By operating in this way, the value d' of the pseudo distance is calculated according to [Equation 3] given above and is outputted from the terminal 19.

Accordingly, with the present embodiment, a formula that uses a polygon to approximate a calculation of distances is used to perform calculations, so that a good calculation method can be achieved using a simple hardware construction. By using such calculated distance values, lens shading and the like can be well corrected in an apparatus, such as a digital camera, where real-time correction processing is required.

In this way, the present invention solves the problems in that calculations of distance conventionally require an extremely large circuit construction when the distance calculation means is realized by hardware, and in that distances could not be calculated with a high degree of precision with simplified hardware.

Figure 18C:
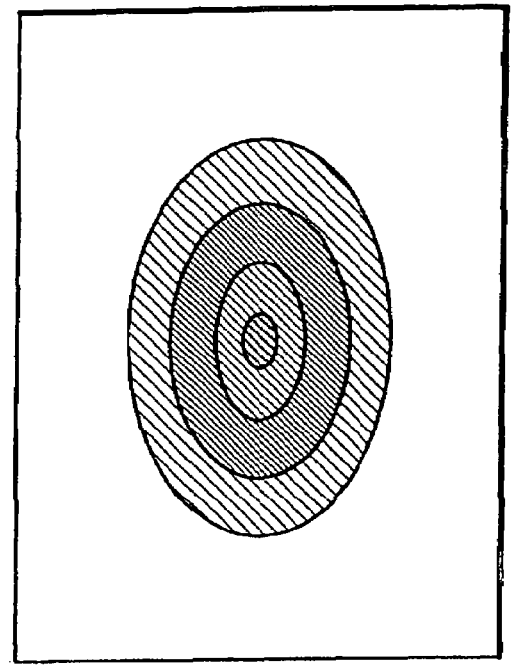
FIG. 18 is an explanatory view of skipping.
Figure 18B:
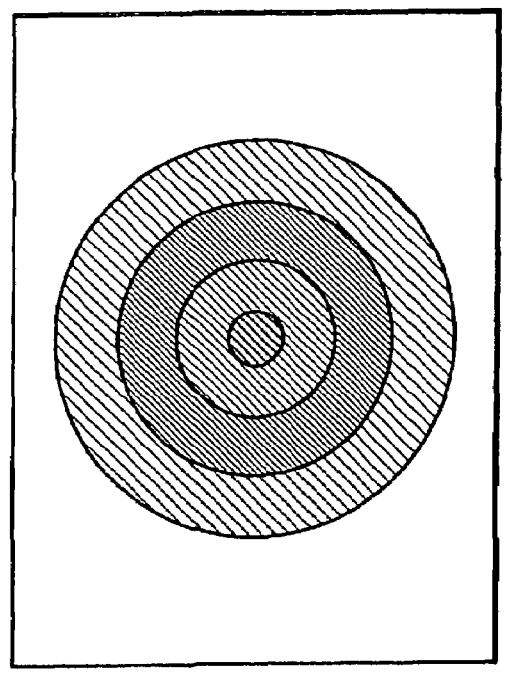
Figure 18A:
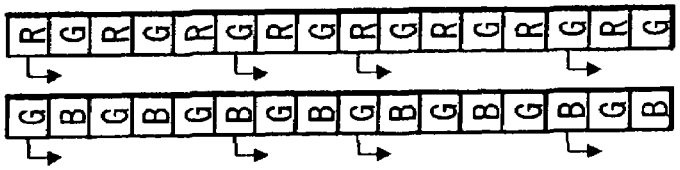

However, with the above embodiment, when the size of the image pick-up unit is changed or when there are changes in the reading out method, such as pixels are skipped in case a charge transfer device is used for the image pick-up unit, it becomes no longer possible to correctly calculate the distance from the optical axis. This is to say, as described in the background art section, when pixels are skipped as shown in FIG. 18A, a correction that is originally performed as shown in FIG. 18B becomes as shown in FIG. 18C due to the skipping, so that corrections cannot be made correctly by using calculations performed with fixed hardware.

For this reason, the following describes means for correctly calculating the distance from the optical axis for cases where such changes have been made. This is to say, FIGS. 6 to 11 show means for correctly calculating the distance from the optical axis for cases where the scanning lines are skipped in the vertical direction, for example. It should be noted that in the description of a block diagram shown in FIGS. 6 to 11, parts that correspond to a block diagram shown in FIG. 3 have been given the same reference numerals and overlapping description thereof is omitted.

Figure 6:
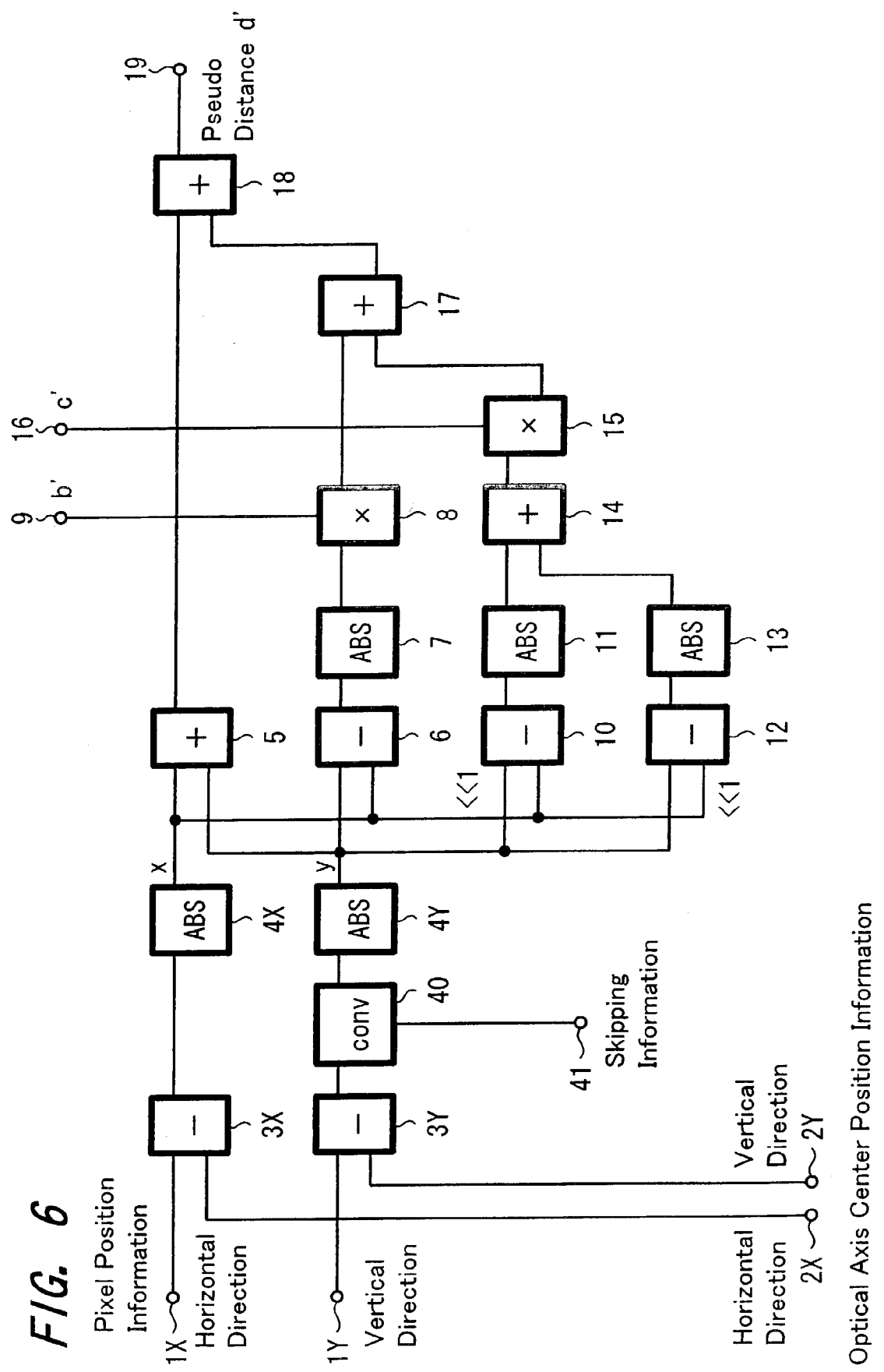
FIG. 6 shows a block diagram of another embodiment of a distance calculation means to which a distance calculation method of the present invention has been applied.
Figure 7:
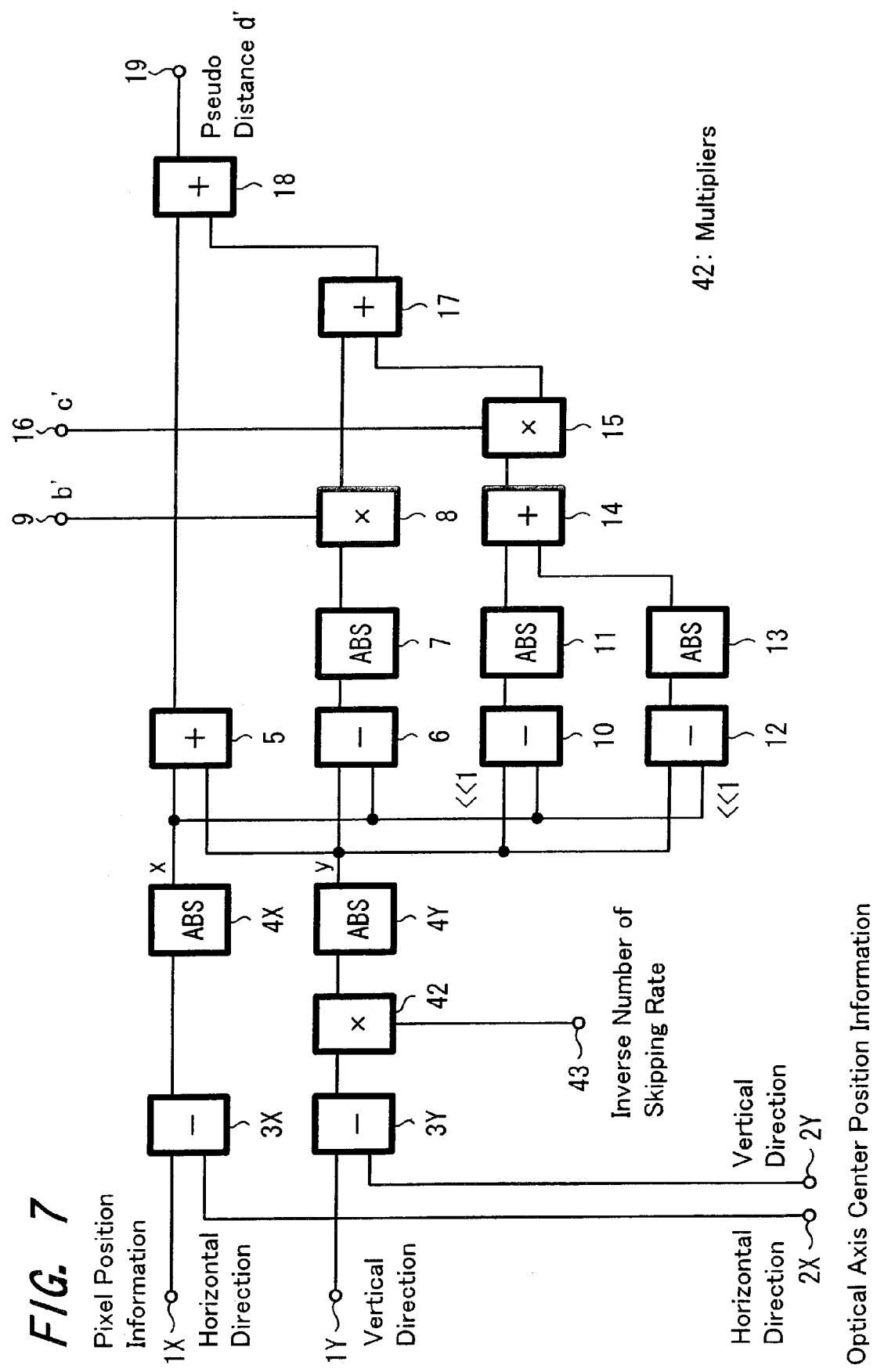
FIG. 7 shows a block diagram of another embodiment of a distance calculation means to which a distance calculation method of the present invention has been applied.

First, in FIG. 6, a value found by the subtractor 3Y, which finds the distance value y in the vertical (Y axis) direction, is supplied to a converter (conv) 40. In accordance with skipping information supplied from a terminal 41 for example, such as in a case where scanning lines are skipped in the vertical direction, the converter 40 converts the value in accordance with the skipping. The converted value is supplied to the absolute value (ABS) circuit 4Y and a distance value y on the Y coordinate axis from an arbitrary origin O given above to a desired point is found.

This is to say, information on a desired pixel position in the vertical direction, for example, is supplied as a count number for a number of scanning lines, though in cases where skipping has been performed, the count value will have been reduced due to lines having been skipped. A conversion in accordance with the skipping information supplied from the terminal 41 is performed by the converter 40 to convert the count value to a count value for the case where there is no skipping, so that the distance from the optical axis can be correctly obtained.

It should be noted that the above conversion is actually performed by multiplying by an inverse number of the skipping rate. Accordingly, the circuit construction in FIG. 6 described above can be constructed as shown in FIG. 7, for example, with a multiplier 42 and a terminal 43 that is supplied with the inverse of the skipping rate. When skipping is performed as shown in A in FIG. 18 mentioned above, for example, the correct values are not restored even if the values are simply multiplied by the inverse number of the skipping rate, though as shown in FIG. 8, the error is ±1, so that this does not have a large effect on the corrected gain, and so does not constitute a problem.

Figure 9:
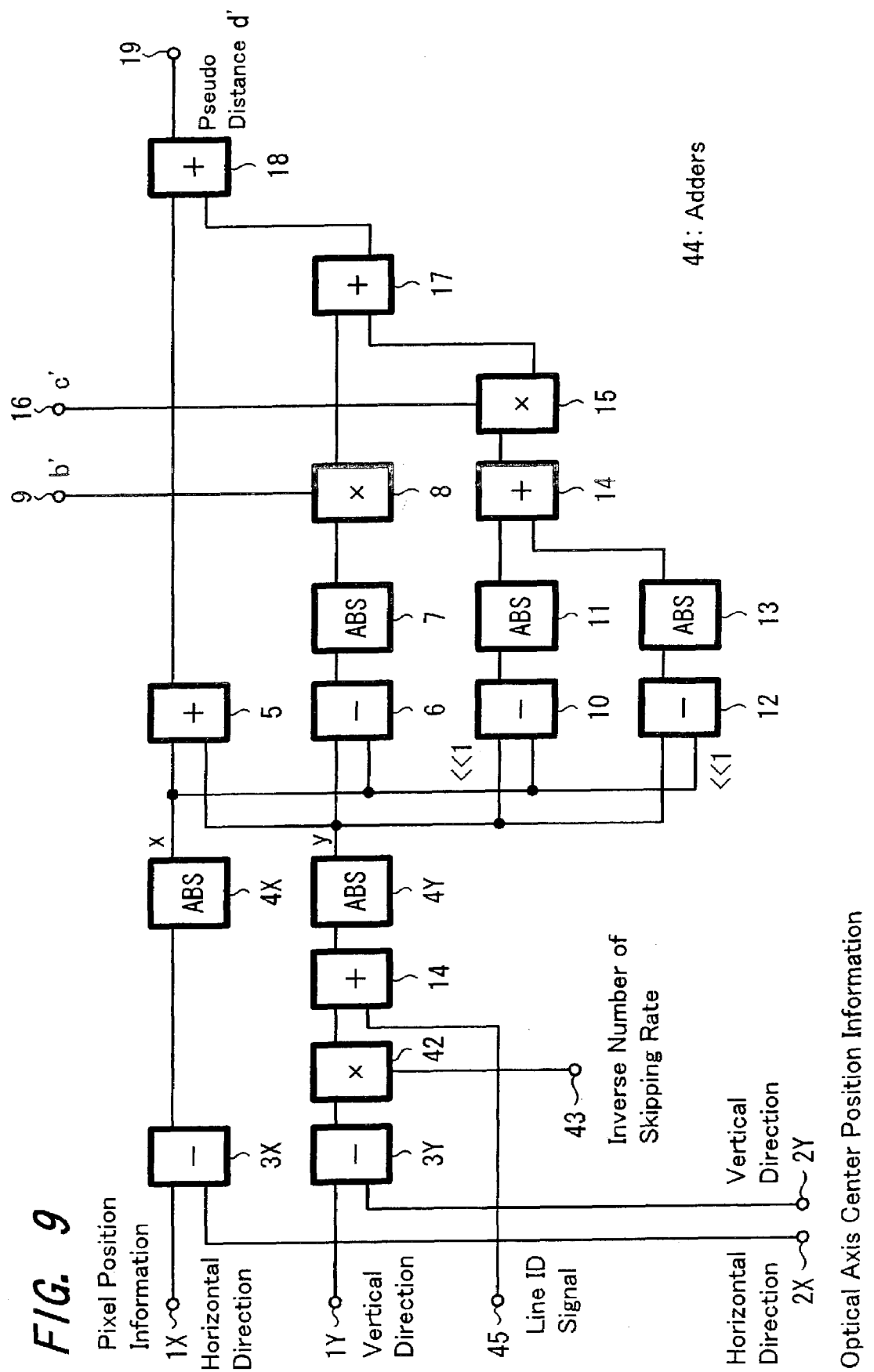
FIG. 9 shows a block diagram of yet another embodiment of a distance calculation means to which a distance calculation method of the present invention has been applied.

However, as shown in FIG. 9 for example, an adder 44 is provided after the multiplier 42 as means for further correcting this kind of error, and a value is added in accordance with a line ID signal (1 bit) that is supplied to a terminal 45 and identifies each line as an odd line or an even line. Accordingly, as shown in FIG. 8, for example, for parts such as the values after conversion "4" or "12" that are not equal to the actual count values "5" and "13", errors in the distance correction can be removed by adding "1".

Figure 10:
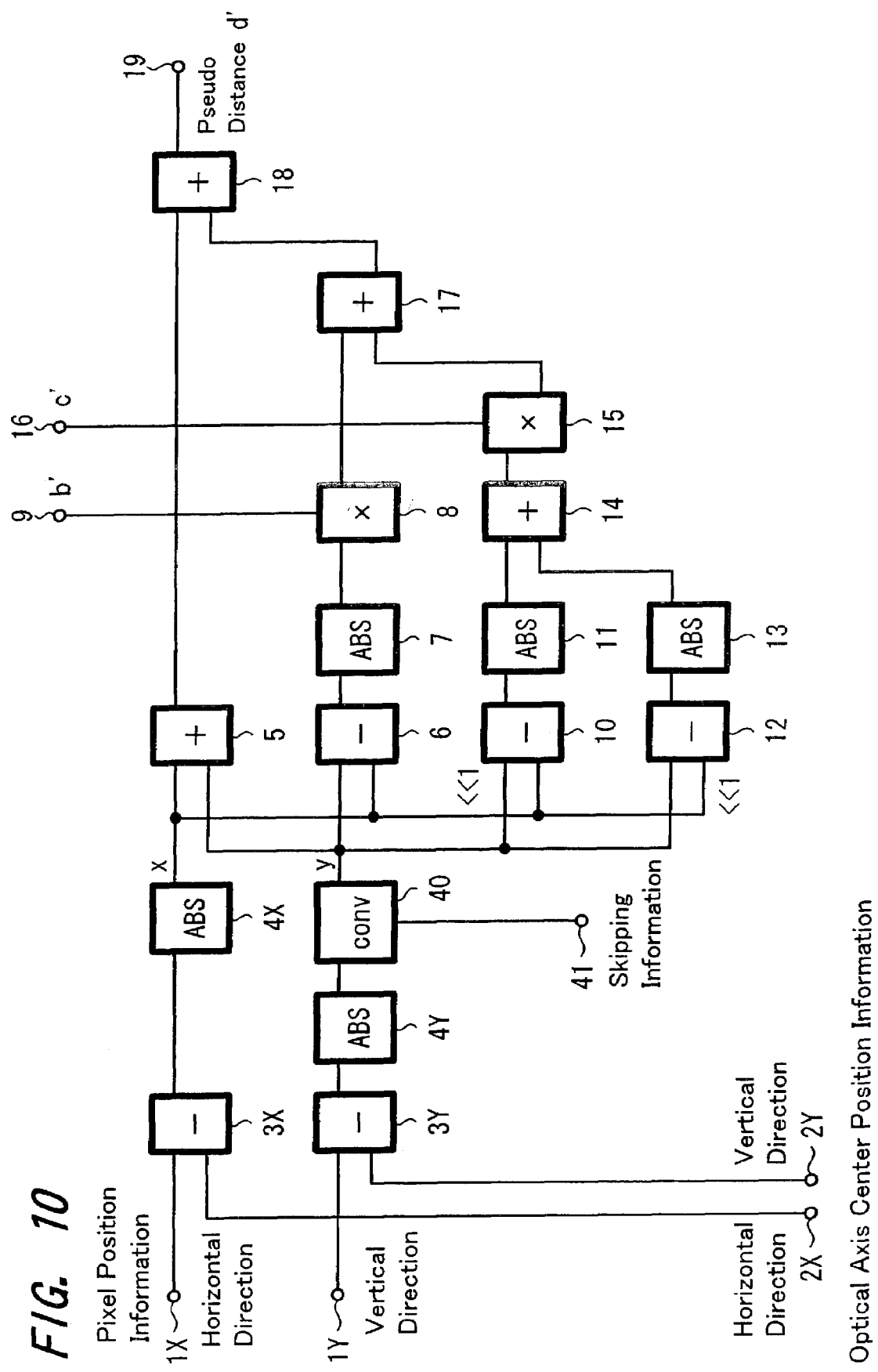
FIG. 10 shows a block diagram of yet another embodiment of a distance calculation means to which a distance calculation method of the present invention has been applied.

In the above conversion of values, the converter 40 (or the multiplier 42) can be disposed after the absolute value circuit 4Y as shown in FIG. 10 for example, with the conversion producing the same values as before.

Figure 11:
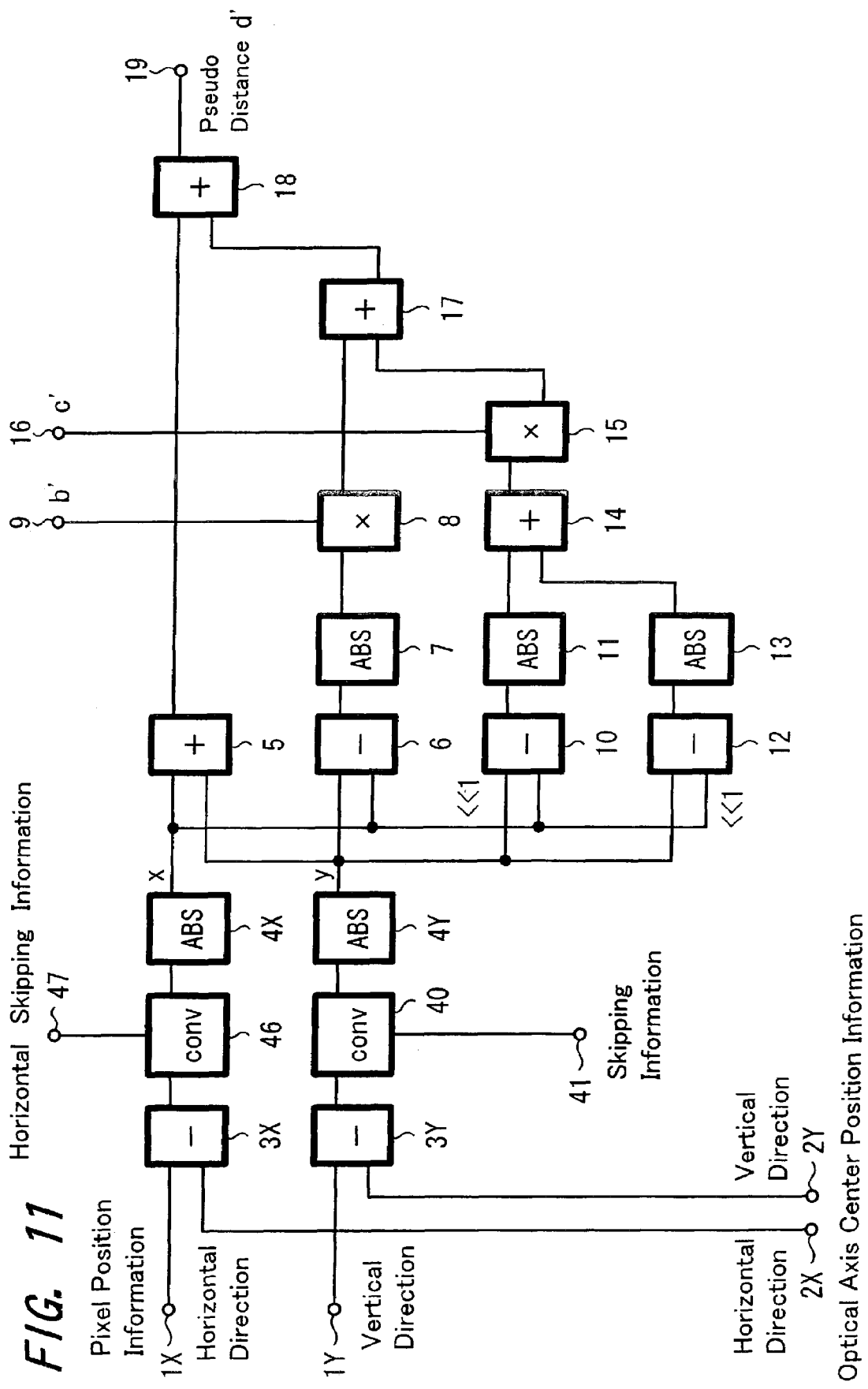
FIG. 11 shows a block diagram of yet another embodiment of a distance calculation means to which a distance calculation method of the present invention has been applied.

In the above conversion of values, when pixels are skipped in the horizontal direction in addition to the line skipping performed in the vertical direction, as shown in FIG. 11 for example, a value found by the subtracter 3X, which finds the distance value x in the horizontal (X axis), is supplied to a converter (conv) 46. Based on horizontal skipping information, supplied from a terminal 47, for example, the converter 46 converts the value in accordance with the skipping. The converted value is supplied to the absolute value (ABS) circuit 4X and a distance value x on the X coordinate axis from an arbitrary origin O given above to a desired point is found.

This is to say, information on a desired pixel position in the horizontal direction, for example, is supplied to the terminal 1X as a count number for a number of pixels, with, in cases where skipping has been performed, the count value having been reduced in accordance with the manner in which the skipping is performed. A conversion in accordance with the skipping information supplied from the terminal 47 is performed by the converter 46 to convert the count value to a count value for a case where there is no skipping of values, so that the distance from the optical axis can be correctly obtained.

It should be noted that the conversion performed when finding the distance value x for the case where a skipping of pixels has also been performed in the horizontal (X axis) direction can be applied to any of the embodiments shown in FIGS. 6, 7, 9, and 10 mentioned above.

Accordingly, with the present embodiment, a formula that uses a polygon to approximate a calculation of distances is used to perform calculations, so that a good calculation method can be achieved using a simple hardware construction, even for cases in which skipping has been performed in the vertical direction and/or horizontal direction. By using such calculated distance values, lens shading and the like can be well corrected in an apparatus, such as a digital camera, where real-time correction processing is required.

In this way, the present invention solves the problems in that calculations of distance conventionally require an extremely large circuit construction when the distance calculation means is realized by hardware, and in that distances could not be calculated with a high degree of precision with simplified hardware.

The following describes an image pick-up apparatus according to the present invention that is provided with a function for correcting peripheral light fall-off and the like in real time by using the distance calculating method of the present invention that is described above. Here, FIG. 12, for example, shows the composition of the signal processing of a digital camera that is provided with a function for correcting peripheral light fall-off and the like in real time.

Figure 12:
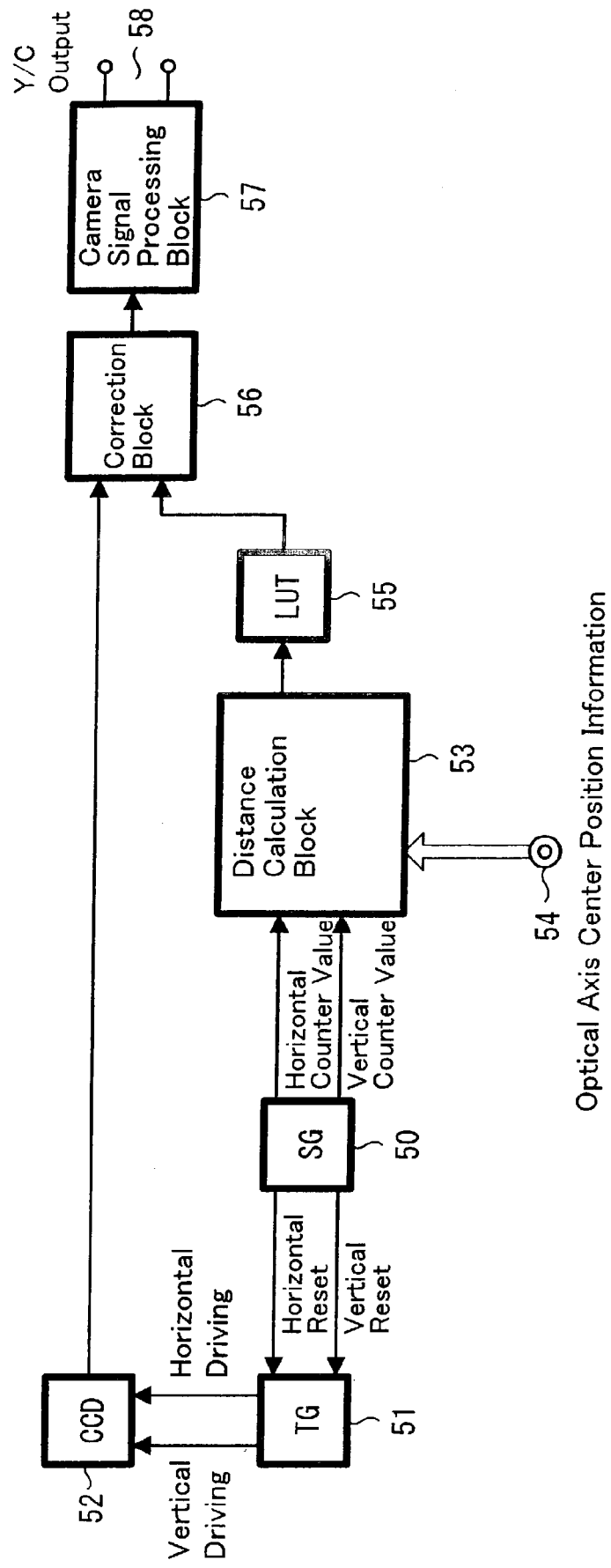
FIG. 12 shows a block diagram of an embodiment of an image pick-up apparatus to which the present invention has been applied.

In FIG. 12, a horizontal reset signal and a vertical reset signal from a signal generator (SG) 50, for example, are supplied to a timing generator (TG) 51, a horizontal driving signal and a vertical driving signal that are generated by the timing generator 51 are supplied to a semiconductor image pick-up device (CCD) 52, and the signals for each pixel subject to image pick-up are read in accordance with the horizontal driving signal and the vertical driving signal from the timing generator 51.

A horizontal counter value and a vertical counter value are also supplied from the signal generator 50 to a distance calculation block 53. Together with this, optical axis center position information is supplied to the distance calculation block 53 from a terminal 54, so that the distance calculation block 53 performs a calculation of distance according to the distance calculation method of the present invention that is described above. This is to say, for each pixel read from the semiconductor image pick-up device 52, a horizontal counter value and a vertical counter value corresponding to the pixel are supplied from the signal generator 50 to the distance calculation block 53, and the distance from the optical axis center position is calculated.

The distance from each pixel to the optical axis center position is supplied from the distance calculation block 53 to a look up table (LUT) 55. Correction coefficients for correcting peripheral light fall-off and the like in accordance with the distance from the optical axis center position are taken from the look up table 55, these correction coefficients are supplied to a correction block 56, and a correction of peripheral light fall-off and the like is performed for the signals for each pixel read from the semiconductor image pick-up device 52 in accordance with the distances of the pixels from the optical axis center position.

It should be noted that the correction block 56 is usually composed of a multiplier for multiplying by the correction coefficients, but an adder may be used in a case where correction is performed by adding an offset. Circuits for performing corrections aside from a peripheral light fall-off correction, such as a correction of color bleeds, may also be included. The signals that have been corrected by the correction block 56 are also supplied to a camera signal processing block 57 where interpolation and synchronization, etc., are performed on the supplied image signals so as to form output image signals (Y/C output signals) that are outputted from a terminal 58.

Accordingly, with the present embodiment, a formula that approximates a calculation of distance using a polygon is used to perform calculations and such calculated distance values are used to correct lens shading and the like. By doing so, distances can be well calculated using a simple hardware construction, and lens shading and the like can be well corrected using the calculated distance values.

In this way, the present invention solves the problems in that calculations of distance conventionally require an extremely large circuit construction when the distance calculation means is realized by hardware, in that distances could not be calculated with a high degree of precision with simplified hardware, and in that it was not possible to correctly find distances from the optical axis in cases where the size of the image pick-up unit is changed or where the reading method is changed, such as when skipping is performed.

Figure 13:
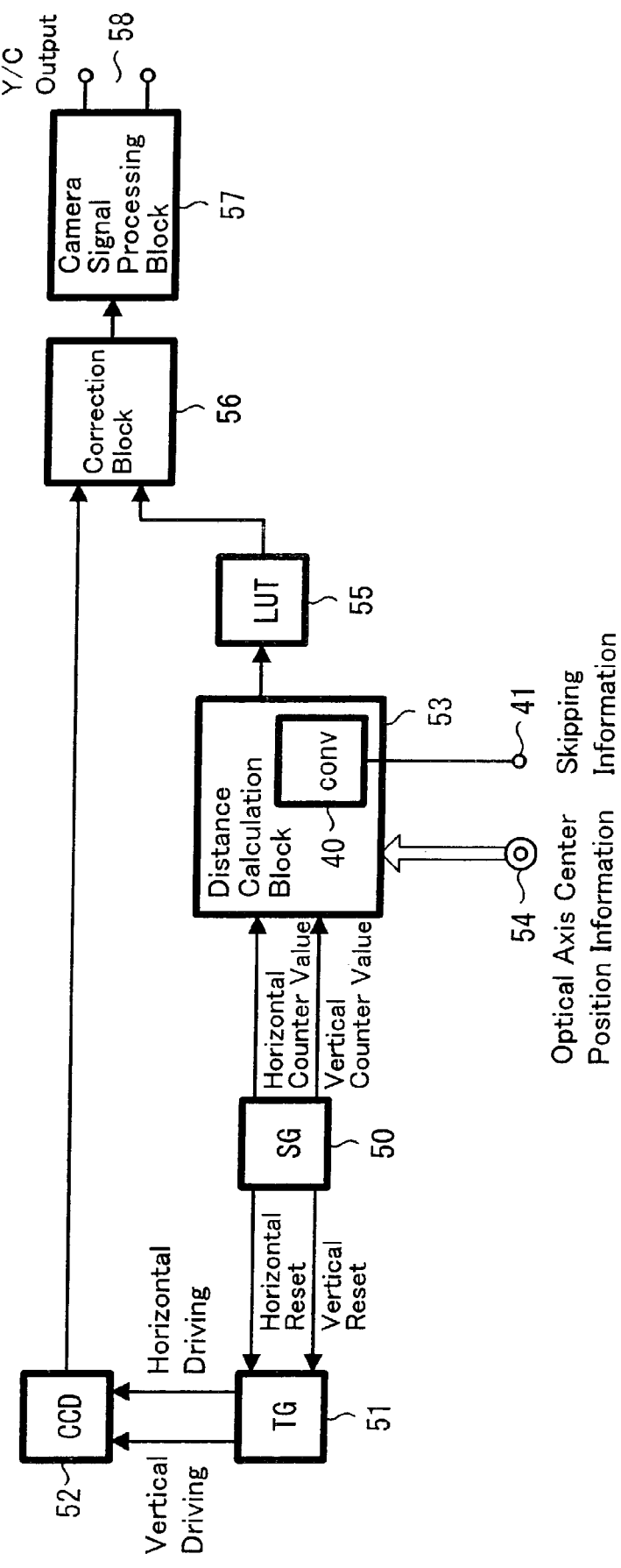
FIG. 13 shows a block diagram of another embodiment of an image pick-up apparatus to which the present invention has been applied.

FIG. 13 shows the composition of the signal processing of a digital camera that is provided with a function for correcting peripheral light fall-off and the like in real time for the case where skipping is performed in the vertical/horizontal direction as described above.

In this case, as shown in FIG. 13, a converter 40 (or a multiplier 42) is provided inside the distance calculation block 53, and a conversion is performed in accordance with the skipping information supplied from the terminal 41 (or the inverse number of the skipping rate supplied from the terminal 43). By doing so, the count values are converted into count values for the case where skipping is not performed, and distances from the optical axis are found correctly, so that a correction of lens shading and the like can be favorably performed.

Figure 14:
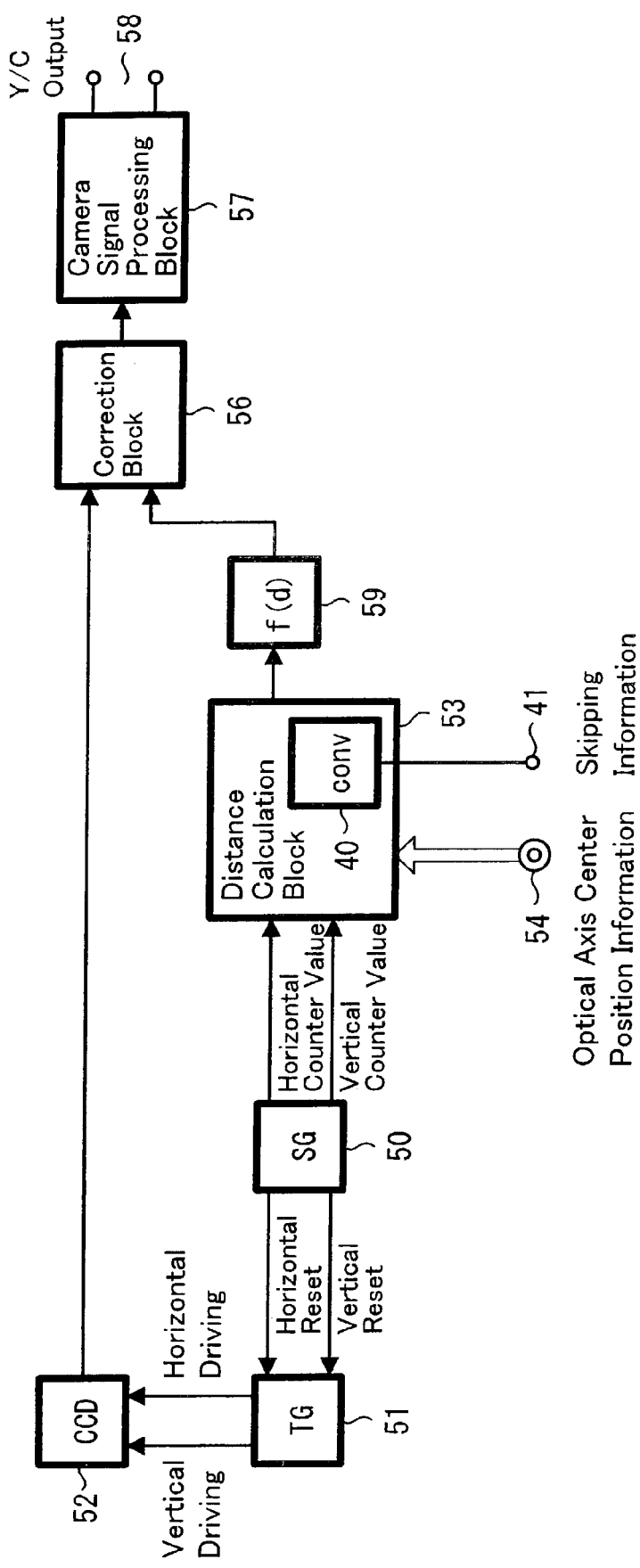
FIG. 14 shows a block diagram of another embodiment of an image pick-up apparatus to which the present invention has been applied.

The look up table 55 mentioned above can also have a construction where correction coefficients for correcting peripheral light fall-off and the like are found for values of distance from the optical center axis, for example. The configuration in this case is shown in FIG. 14, with a calculation block 59 for correction coefficients f (d) being provided in place of the look up table 55 mentioned above. In this case also, lens shading and the like can be well corrected using calculated distance values.

Figure 15:
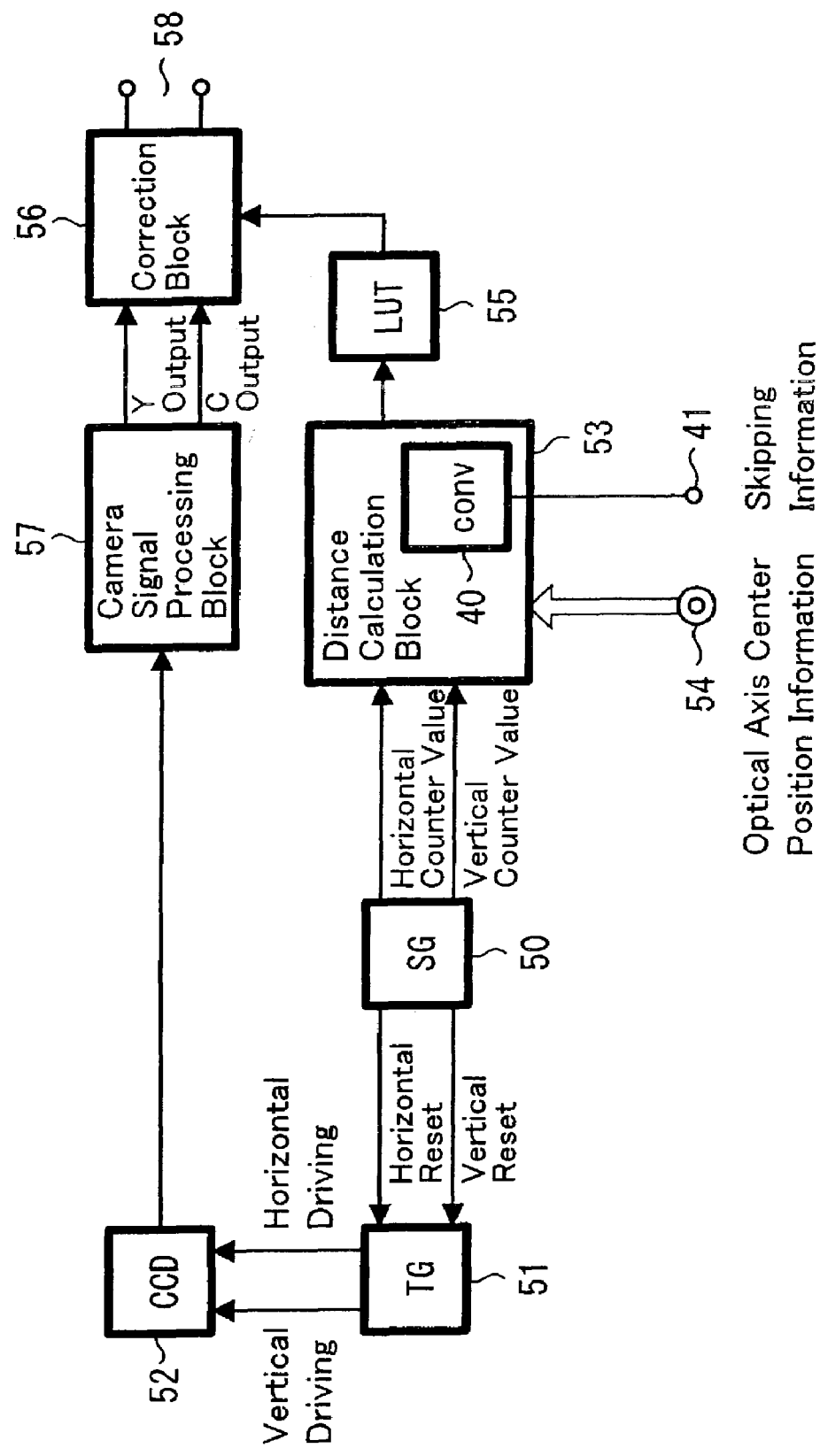
FIG. 15 shows a block diagram of another embodiment of an image pick-up apparatus to which the present invention has been applied.

In the above embodiments, the correction block 56 that performs a conversion may also be provided after the camera signal processing block 57 as shown in FIG. 15, for example. In this case, correction is performed after the separation into a luminance signal (Y signal) and color difference signals (Cb, Cr signals) so that corrections can be performed separately for the luminance signal and the color difference signals, such as by performing a correction of peripheral light fall-off on the luminance signal and a correction of color bleeds on the color difference signals.

Figure 16:
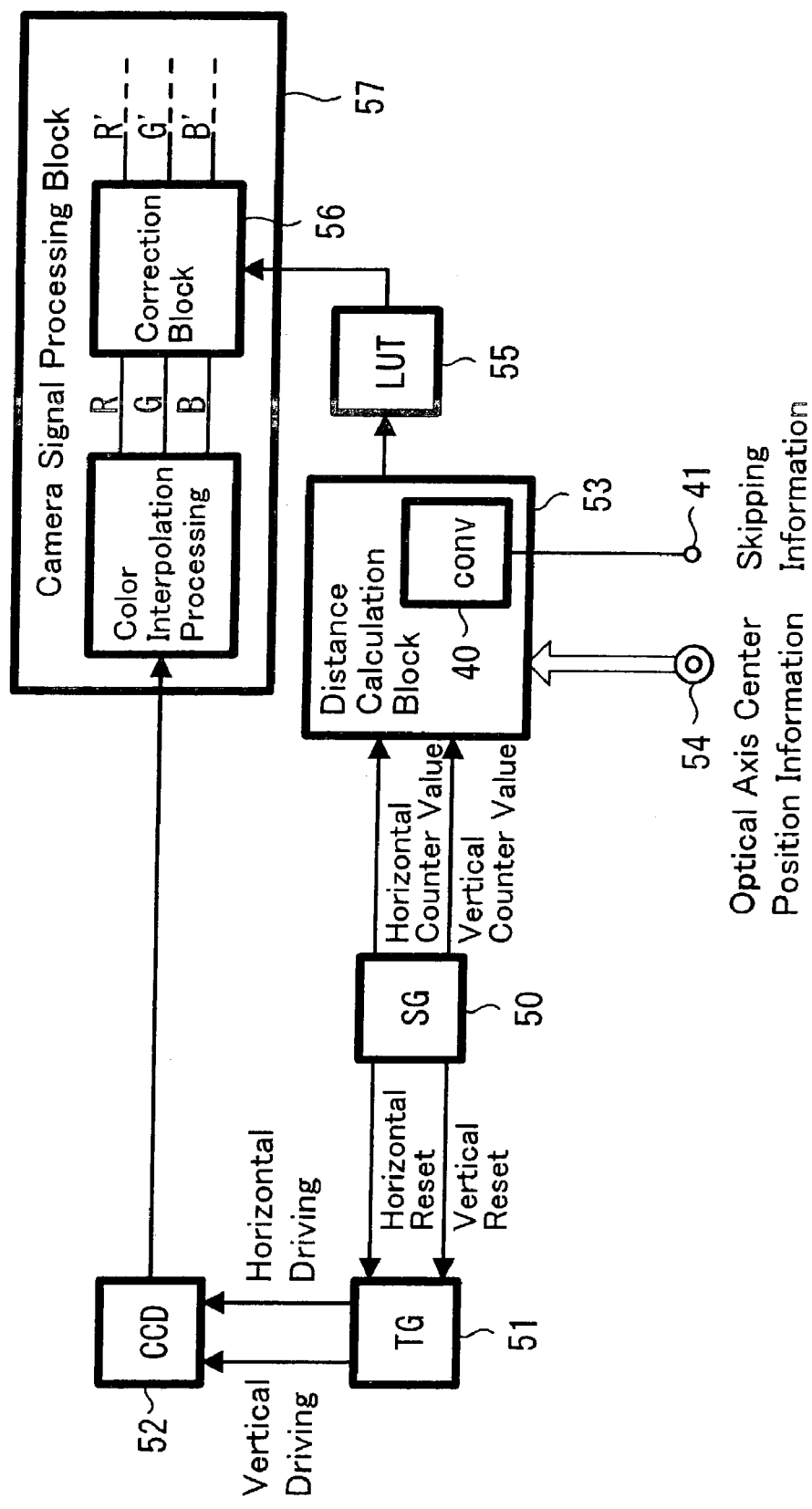
FIG. 16 shows a block diagram of another embodiment of an image pick-up apparatus to which the present invention has been applied.
Figure 17:
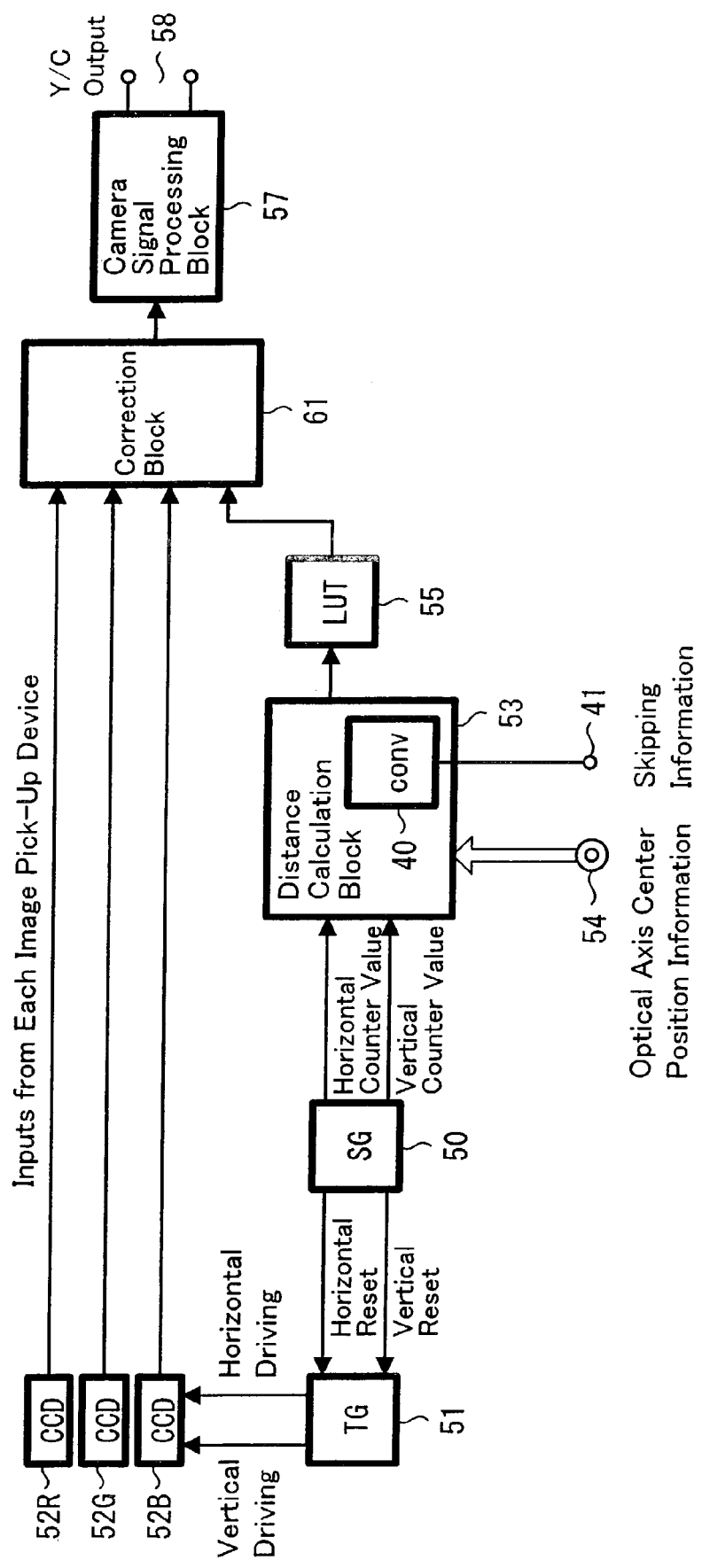
FIG. 17 shows a block diagram of another embodiment of an image pick-up apparatus to which the present invention has been applied.

Also, this type of correction block 56 may be provided after a color interpolation processing block 60, for example, in the camera signal processing block 57 as shown in FIG. 16 for example, so that the correction of lens shading may be performed once color signals for the three primary colors (R, G, B) have been obtained for all of the pixels through interpolation. In an apparatus that is provided with a plurality of image pick-up devices, a correction block 61 that performs correction for each of the image pick-up devices 52R, 52G, 52B may be provided, as shown in FIG. 17 for example.

In the embodiments described above, in each case the look up table 55 is realized by a single block, though the look up table 55 may store values separately for the three primary colors (R, G, B), or for the luminance signal (Y signal) and the color difference signals (Cb, Cr signals).

It should be noted that the image pick-up apparatus of the present invention is described as being applied to a digital still camera that usually takes still images, though by making use of the ability to calculate distances in real time, the present invention may also be applied to a digital video camera that takes moving pictures.

The distance calculation method described above receives an input of the XY coordinates of an arbitrary point and the XY coordinates of a desired point and calculates the distance between the arbitrary point and the desired point, and by performing a calculation for the desired point using an approximation to an arbitrary polygon that is centered on the arbitrary-point, a favorable calculation of distance can be performed using a simple hardware construction. By using distance values calculated in this way, lens shading and the like can be well corrected in an apparatus, such as a digital camera, where real-time correction processing is required.

Also, the image pick-up apparatus described above includes a lens system and an image pick-up unit from which signals are outputted in accordance with an XY coordinate system, and has a distance calculation means that receives an input of XY coordinates corresponding to the optical axis of the lens system and XY coordinates of a desired point and calculates the distance between a point corresponding to the optical axis and the desired point using a calculation method that approximates the distance to the desired point using an arbitrary polygon which is centered on the point corresponding to the optical axis. Distance values calculated by the distance calculation means are used to correct at least shading for peripheral light fall-off due to the lens system, so that in addition to distances being well calculated by a simple hardware construction, lens shading and the like can be well corrected using the calculated distance values.

It should be noted that the present invention is not limited to the embodiments that are described above and can be subjected to a variety of modifications without departing from the scope of the invention.

This is to say, with the distance calculation method of the present invention, distances are calculated by performing a calculation that approximates the distances using polygons, so that distances can be favorably calculated using a simple hardware construction, and by using the calculated distance values, correction of lens shading and the like can be well performed in an apparatus, such as a digital camera, that needs to perform correction processing in real time.

According to the present invention, the distance on the X coordinate axis between an arbitrary point and a desired point is set at x and the distance on the Y coordinate axis is set at y, the polygon is set as a 16-sided polygon, and a calculation of distance is performed using the approximation $(x+y)+A|x-y|+B[|2x-y|+|x-2y|]$, so that distances are well calculated using a simple hardware construction.

Also, with the present invention, distances are calculated using arbitrary approximate values for coefficients in the approximation of a polygon, so that distances can be favorably calculated using an even simpler hardware construction.

Also, with the present invention, distances are calculated with the values of $A=3/16$ and $B=1/8$ as the coefficient values, so that distances can be well calculated using an extremely simple hardware construction.

Also, with the present invention, when an arbitrary process that compresses or expands XY coordinates is performed, by converting the inputted values x and y in accordance with the rate of the compression or expansion and calculating the distances, distances can be well calculated using a simple hardware construction.

Also, with the present invention, the distance on the X coordinate axis between an arbitrary point and a desired point is set at x and the distance on the Y coordinate axis is set at y, the polygon is set as an 8-sided polygon, and a calculation of distance is performed using the approximation $(x+y)+C|x-y|$, so that distances can be well calculated using a even simpler hardware construction.

Also, with the present invention, distances are calculated using arbitrary approximate values for the coefficients in the approximation of a polygon, so that distances can be favorably calculated using an even simpler hardware construction.

Also, with the present invention, distances are calculated with the value of $C=1/2$ as the coefficient value, so that distances can be well calculated using an extremely simple hardware construction.

Also, with the present invention, when an arbitrary process that compresses or expands XY coordinates is performed, by converting the inputted values x and y in accordance with the rate of the compression or expansion and calculating the distances, distances can be well calculated using a simple hardware construction even when coordinates are skipped.

Also, with the image pick-up apparatus of the present invention, the calculation of distances is performed by calculating an approximation using a polygon and the calculated distance values are used to correct lens shading and the like, so that distances can be favorably calculated using a simple hardware construction, and correction of lens shading and the like can be well performed using the calculated distance values.

Also with the present invention, the distance on the X coordinate axis between a point on an image pick-up unit corresponding to the optical axis of a lens system and a desired point is set at x and the distance on the Y coordinate axis is set at y, the polygon is set as a 16-sided polygon, and a calculation of distance is performed using the approximation $(x+y)+A|x-y|+B[|2x-y|+|x-2y|]$, so that distances are favorably calculated using a simple hardware construction, and lens shading and the like can be well corrected using the calculated distance values.

Also, with the present invention, distances are calculated using arbitrary approximate values for the coefficients in the approximation of a polygon, so that distances can be favorably calculated using an even simpler hardware construction and lens shading and the like can be well corrected using the calculated distance values.

Also, with the present invention, distances are calculated with the values of $A=3/16$ and $B=1/8$ as the coefficient values, so that distances can be favorably calculated using an extremely simple hardware construction and lens shading and the like can be well corrected using the calculated distance values.

Also, with the present invention, when the reading of signals from the image pick-up unit is performed with an arbitrarily skipping in the XY coordinate axes, distances are calculated after converting the inputted values x and y in accordance with the preset skipping ratio, so that even in the case where skipping is performed, distances can be favorably calculated using a simple hardware construction and lens shading and the like can be well corrected using the calculated distance values.

Also with the present invention, on an image pick-up unit the distance on the X coordinate axis between a point corresponding to the optical axis of a lens system and a desired point is set at x and the distance on the Y coordinate axis is set at y, the polygon is set as an 8-sided polygon, and a calculation of distance is performed using the approximation $(x+y)+C|x-y|$, so that distances are favorably calculated using an even simpler hardware construction, and lens shading and the like can be well corrected using the calculated distance values.

Also, with the present invention, distances are calculated using an arbitrary approximate value for the coefficient in the approximation of a polygon, so that distances can be favorably calculated using an even simpler hardware construction and lens shading and the like can be well corrected using the calculated distance values.

Also, with the present invention, distances are calculated with the value of $C=1/2$ as the coefficient value, so that distances can be favorably calculated using an extremely simple hardware construction and lens shading and the like can be well corrected using the calculated distance values.

Also, with the present invention, when the reading of signals from the image pick-up unit is performed with an arbitrarily skipping in the XY coordinate axes, distances are calculated after converting the inputted values x and y in accordance with the preset skipping ratio, so that even in the case where skipping is performed, distances can be favorably calculated using a simple hardware construction and lens shading and the like can be well corrected using the calculated distance values.

In this way, the present invention can solve the problems in that with a conventional method and apparatus, calculations of distance require an extremely large circuit construction when the distance calculation means is realized by hardware, distances cannot be calculated with a high degree of precision with simplified hardware, and it is not possible to correctly find distances from the optical axis for cases where the size of the image pick-up unit has changed or where the reading method has changed, such as when skipping is performed.

The invention claimed is:

1. A method for calculating a distance from an optical axis of an imaging device to an input point, comprising:
   approximating the input point with an arbitrary polygon with eight or more sides centered on the optical axis of the imaging device;
   calculating a distance between a point corresponding to the optical axis of the imaging device and the input point as a function of the arbitrary polygon;
   determining a value x representing a distance between the point corresponding to the optical axis and the input point along an X axis;
   determining a value y representing a distance between the point corresponding to the optical axis and the input point along a Y axis;
   determining constant coefficients A and B; and
   calculating the distance between the point corresponding to the optical axis and the input point as approximately equal to
   (x+y)+A*abs(x−y)+B*[abs(2x−y)+(x−2y)],
   wherein abs( ) is an absolute value function.

2. The method according to claim 1, further comprising: correcting defects of a lens sub-system of the imaging device as a function of the calculated distance.

3. The method according to claim 1, wherein the arbitrary polygon has 16 sides.

4. The method according to claim 3, wherein the constant coefficients A and B are approximated by approximate values.

5. The method according to claim 4, wherein A is approximately 3/16 and B is approximately 1/8.

6. The method according to claim 3, further comprising:
   resizing the X axis by a predetermined ratio to obtain a converted value x;
   resizing the Y axis by the predetermined ratio to obtain a converted value y; and
   calculating the distance between the point corresponding to the optical axis and the input point using the converted value x and the converted value y.

7. The method according to claim 1, wherein the arbitrary polygon has 8 sides.

8. The method according to claim 7, wherein a constant coefficient C is approximated by an approximate value.

9. The method according to claim 8, wherein the constant coefficient C is approximately 1/2.

10. The method according to claim 7, further comprising:
    resizing the X axis by a predetermined ratio to obtain a converted value x;
    resizing the Y axis by the predetermined ratio to obtain a converted value y; and
    calculating the distance between the point corresponding to the optical axis and the input point by using the converted value x and the converted value y.

11. An imaging device, comprising:
    a lens sub-system having an optical axis;
    an imaging sub-system;
    means for approximating an input point from the imaging sub-system with an arbitrary polygon with eight or more sides centered on the optical axis; and
    means for calculating a distance between a point corresponding to the optical axis and the input point as a function of the arbitrary polygon;
    means for determining a value x representing a distance between the point corresponding to the optical axis and the input point along an X axis;
    means for determining a value y representing a distance between the point corresponding to the optical axis and the input point along a Y axis;
    means for determining constant coefficients A and B; and
    means for calculating the distance between the point corresponding to the optical axis and the input point as approximately equal to
    (x+y)+A*abs(x−y)+B*[abs(2x−y)+(x−2y)],
    wherein abs( ) is an absolute value function.

12. The device according to claim 11, further comprising: means for correcting defects due to the lens sub-system.

13. The device according to claim 11, wherein the arbitrary polygon has 16 sides.

14. The device according to claim 13, wherein the constant coefficients A and B are approximated by approximate values.

15. The device according to claim 14, wherein A is approximately 3/16 and B is approximately 1/8.

16. The device according to claim 13, further comprising:
    means for skipping signals from the imaging sub-system along the X axis by a predetermined ratio to obtain a converted value x;
    means for skipping signals from the imaging sub-system along the Y axis by the predetermined ratio to obtain a converted value y; and
    calculating the distance between the point corresponding to the optical axis and the input point by using the converted value x and the converted value y.

17. The device according to claim 11, wherein the arbitrary polygon has 8 sides.

18. The device according to claim 17, wherein a constant coefficient C is approximated by an approximate value.

19. The device according to claim 18, wherein the constant coefficient C is approximately 1/2.

20. The device according to claim 17, further comprising:
    means for skipping signals from the imaging sub-system along the X axis by a predetermined ratio to obtain a converted value x;
    means for skipping signals from the imaging sub-system along the Y axis by the predetermined ratio to obtain a converted value y; and
    means for calculating the distance between the point corresponding to the optical axis and the input point by using the converted value x and the converted value y.

21. An imaging device, comprising:
    a lens sub-system having an optical axis;
    an imaging sub-system; and
    a processor coupled to the imaging sub-system, the processor programmed to execute program code to:
    approximate an input point from the imaging sub-system with an arbitrary polygon with eight or more sides centered on the optical axis; and calculate a distance between a point corresponding to the optical axis and the input point as a function of the arbitrary polygon;

determine a value x representing a distance between the point corresponding to the optical axis and the input point along an X axis;

determine a value y representing a distance between the point corresponding to the optical axis and the input point along a Y axis;

determine constant coefficients A and B; and calculate the distance between the point corresponding to the optical axis and the input point as approximately equal to (x+y)+A*abs(x−y)+B*[abs(2x−y)+(x−2y)], wherein abs( ) is an absolute value function.

22. The device according to claim 21, wherein the processor is programmed to execute program code to:
correct defects due to the lens sub-system.

23. The device according to claim 21, wherein the arbitrary polygon has 16 sides.

24. The device according to claim 23, wherein the constant coefficients A and B are approximated by approximate values.

25. The device according to claim 24, wherein A is approximately 3/16 and B is approximately 1/8.

26. The device according to claim 23, wherein the processor is programmed to execute program code to:

skip signals from the imaging sub-system along the X axis by a predetermined ratio to obtain a converted value x;

skip signals from the imaging sub-system along the Y axis by the predetermined ratio to obtain a converted value y; and calculate the distance between the point corresponding to the optical axis and the input point by using the converted value x and the converted value y.

27. The device according to claim 21, wherein the arbitrary polygon has 8 sides.

28. The device according to claim 27, wherein a constant coefficient C is approximated by an approximate value.

29. The device according to claim 28, wherein the constant coefficient C is approximately 1/2.

30. The device according to claim 27, wherein the processor is programmed to execute program code to:

skip signals from the imaging sub-system along the X axis by a predetermined ratio to obtain a converted value x;

skip signals from the imaging sub-system along the Y axis by the predetermined ratio to obtain a converted value y; and calculate the distance between the point corresponding to the optical axis and the input point by using the converted value x and the converted value y.

* * * * *